Feb. 12, 1935.   R. VAN MEEUWEN   1,991,266

LIQUID DISPENSING APPARATUS

Filed July 23, 1934   3 Sheets-Sheet 1

INVENTOR
Robert van Meeuwen
BY
ATTORNEY

Feb. 12, 1935.  R. VAN MEEUWEN  1,991,266
LIQUID DISPENSING APPARATUS
Filed July 23, 1934   3 Sheets-Sheet 2

INVENTOR
Robert van Meeuwen
BY
ATTORNEY

Feb. 12, 1935.　　　R. VAN MEEUWEN　　　1,991,266
LIQUID DISPENSING APPARATUS
Filed July 23, 1934　　　3 Sheets-Sheet 3
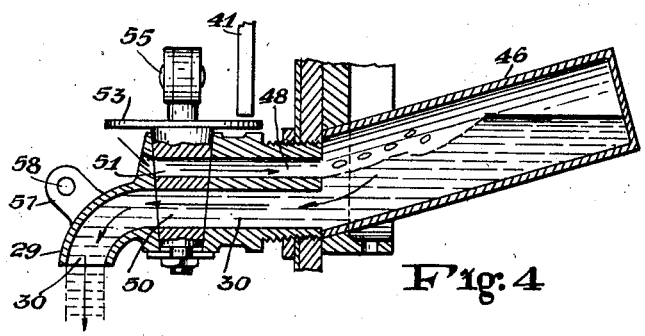
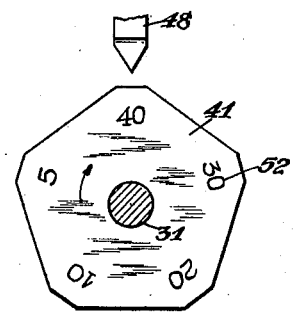
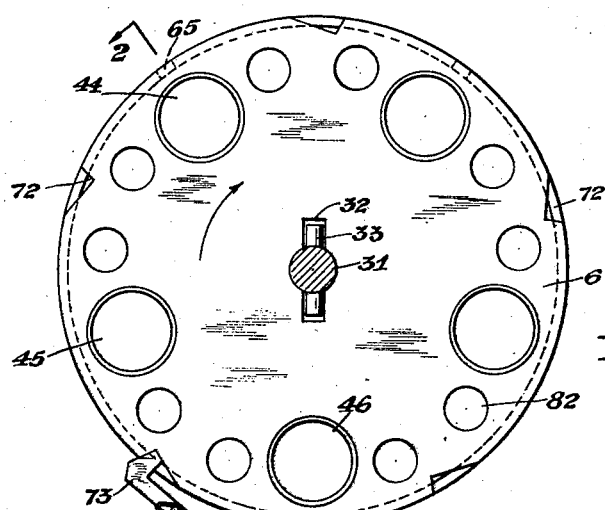
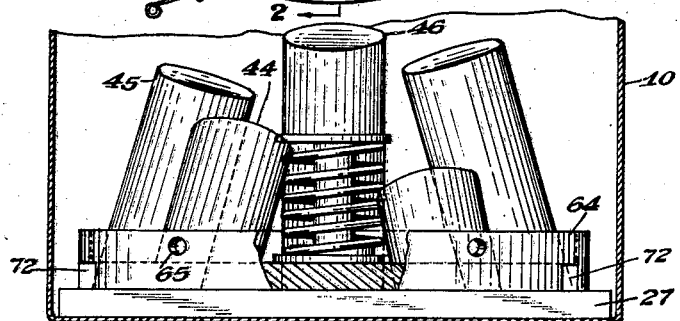
INVENTOR
Robert van Meeuwen
BY
ATTORNEY Patented Feb. 12, 1935

1,991,266

UNITED STATES PATENT OFFICE 1,991,266

LIQUID DISPENSING APPARATUS

Robert van Meeuwen, Haarlem, Netherlands, assignor to G. S. Miller Co.'s Automotief Producten N. V., Amsterdam, Netherlands, a corporation of the Netherlands Application July 23, 1934, Serial No. 736,528
In the Netherlands August 3, 1933

20 Claims. (Cl. 221—107)

This invention relates to liquid dispensing devices and more particularly refers to improvements in apparatus for dispensing liquids in predetermined quantities.

In the merchandising and use of liquid substances it is frequently necessary to draw the liquid from a container in predetermined quantities and this operation usually entails the necessity of first causing the liquid to flow into a measuring receptacle and then pouring the measured quantity of liquid from said receptacle into another container. Such a manner of dispensing liquids naturally consumes time and also results in losses in spilling from one container into another and losses from incorrect measuring. Furthermore the danger of contamination of the liquid thus dispensed is always present, due to dirt or impurities which may collect in the measuring receptacle, unless it is cleaned every time after it has been used and put in a protected place.

The time consumed and the danger of inaccuracy in measuring are naturally multiplied when it is necessary to draw different quantities of liquids at different times. When frequent withdrawals of liquid are to be effected it is, therefore, desirable to provide some means whereby the correct amount of liquid can be withdrawn in the shortest possible time, without unnecessary losses through spilling and otherwise.

Accordingly the primary object of this invention is to provide a novel and improved apparatus whereby liquid can be drawn from a container in any one of a variety of predetermined quantities, merely by setting an indicating device to the position corresponding to the quantity of liquid to be withdrawn.

Another object is to provide an apparatus of the character specified, whereby an outflow of the exact quantity of liquid for which the indicating device has been set, no more, no less, will be positively assured.

A further object is to provide a novel and improved apparatus for dispensing liquids, provided with means for positively determining any one of a variety of quantities of liquid to be withdrawn therefrom and also provided with a graduation constituting a check on the total quantity of liquid withdrawn.

A still further object is to provide an apparatus of the character specified, provided with means for preventing tampering with its contents by unauthorized persons.

Other objects and advantages of the present invention will more fully appear as the description proceeds and will be set forth and claimed in the appended claims.

My invention is illustrated by way of example in the accompanying drawings, in which:

Fig. 4 is a fragmentary vertical section showing the outlet controlling member in the liquid discharging position;

Fig. 5 is a detail vertical section through line 5—5 of Fig. 2;

Fig. 6 is a detail vertical section through line 6—6 of Fig. 2;

Fig. 7 is a fragmentary horizontal section through line 7—7 of Fig. 2; and

Figure 1:
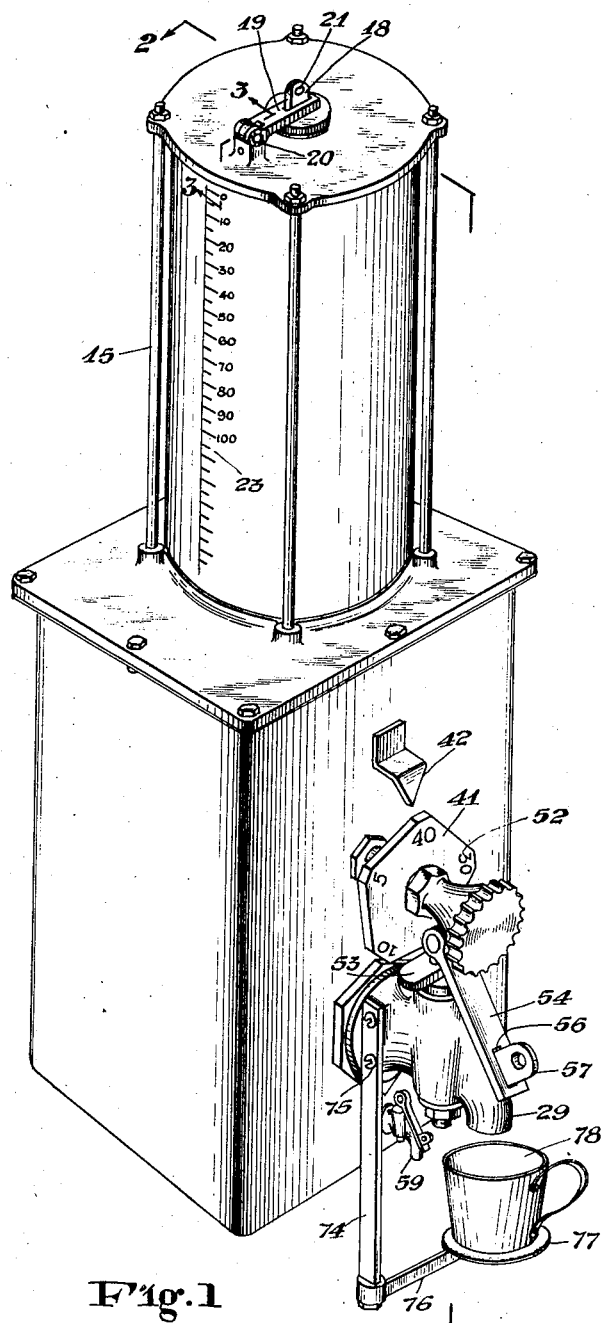
Fig. 1 is a view in perspective of an apparatus embodying my invention.
Figure 3:
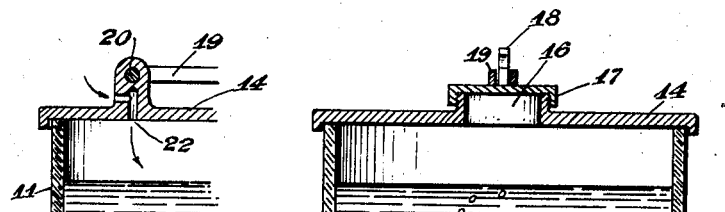
Fig. 3 is a detail vertical section through line 3—3 of Fig. 1.

The apparatus illustrated in the drawings comprises a container consisting of an open top lower receptacle 10, a glass cylinder 11 upwardly extending therefrom, a base 12 for said glass cylinder, connected to the upper part of receptacle 10 by bolts 13, a top 14 for said glass cylinder, and a plurality of tie rods 15 extending vertically from said base and through said top, circumferentially arranged around said cylinder, connecting said top to said base, so as to form with the cylinder and the lower receptacle a water-tight enclosure.

The top 14 is provided with an inlet 16, which may be closed by a cap 17, and means are preferably provided for locking said cap in its closed position. For instance, the cap may be provided with an upwardly extending lug 18, engageable by a locking member 19, pivotally mounted at 20, so as to be movable in or out of engagement with said lug. When the locking member is in the locking position, shown in Figs. 1 and 2, the lug projects vertically therethrough, making it possible for a padlock to be inserted through its opening 21, in order to retain the locking member in its locking position, and so prevent access to the container by unauthorized persons.

In order to permit liquid to flow out of the container, the top 14 is provided with a vent, as shown at 22, making it possible for air to enter the container.

The glass cylinder is preferably provided with a graduation, such as shown at 23, affording a means of checking at any time the total quantity of liquid withdrawn from the container.

The dispensing mechanism proper is mounted on the lower receptacle 10, which receptacle is provided with a plate 24, fixed onto the inner surface of its front wall 25, and forming an abutment for a rotating carrier 26.

Plate 24 and front wall 25 are provided with an outlet 27, in proximity of the bottom 28 of the receptacle, and a tap 29 is secured to said outlet so as to permit liquid to flow out of the container from its discharge outlet 30.

Carrier 26, which is in the form of a substantially circular plate, is mounted on a shaft 31, so as to rotate therewith while being free to move axially thereof. For instance, the carrier may be provided with a diametrically directed slot 32, which is engaged by a pin 33 inserted through shaft 31, and outwardly projecting therefrom.

Shaft 31 is rotatably inserted through front wall 25 and plate 24, through the intermediary of a nut, and a gland 35, retaining packing material 36 around said shaft. Said shaft projects at the rear within the container and is provided at the rear end with an abutment 37 for a spring 38, imprisoned between said abutment and a pressure washer 39, abutting against the rear surface of carrier 26. The front end of the shaft is provided with a knob 40 and a disk 41, forming together with an indicator 42, an indicating device for setting the carrier 26 in its various operative positions.

By virtue of this arrangement it will be seen that spring 38 tends at all times to retain shaft 31 in the position shown, where disk 41 abuts against gland 35, while at the same time the pressure exerted by said spring is applied by washer 39 against carier 26, so as to hold said carrier in close contact with the inner surface of plate 24, so as to prevent leakages of liquid therebetween.

It will be observed that shaft 31 is vertically spaced from outlet 27 and that the upper end of plate 24 does not reach all the way up to the top of receptacle 10, so as to leave a clearance space 43 between the front surface of the upper part of carrier 26 and the inner surface of front wall 25.

Carrier 26 is provided with a number of open front rearwardly extending chambers, such as 44, 45, 46, said chambers being of different predetermined capacities and being circumferentially distributed around said carrier at a radial distance from the axis of rotation thereof, corresponding to the distance between said axis and the center of outlet 27. It follows that during the rotation of carrier 26, said chambers will successively come to register with said outlet and with tap 29 extending therefrom.

Figure 2:
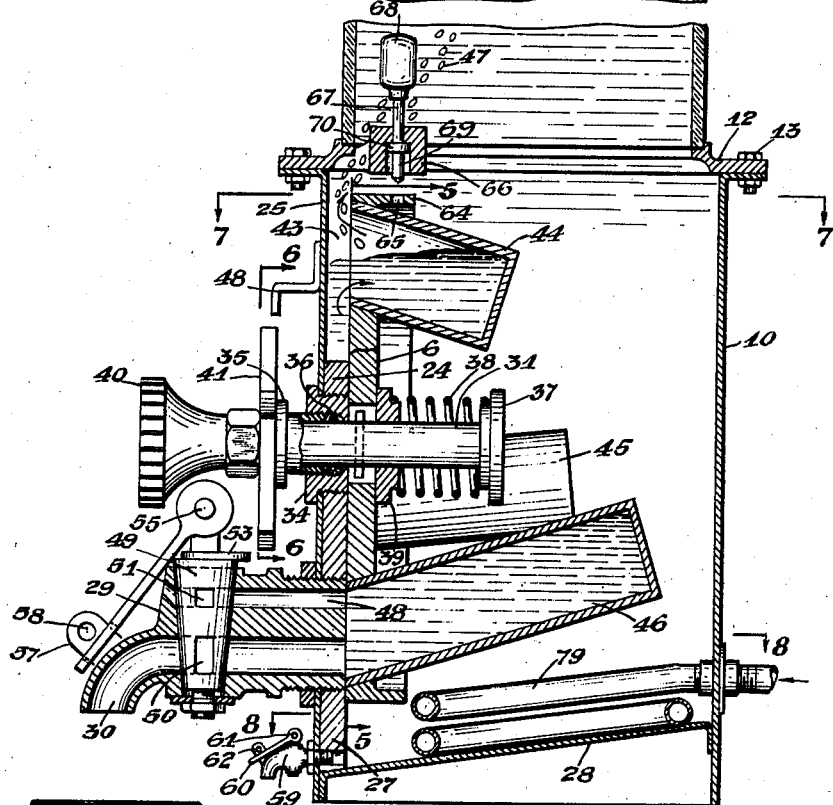
Fig. 2 is a vertical cross section of the same through line 2—2 of Fig. 1.

Said chambers, which, in the example illustrated, are shown as being five in number, are inclined from front to rear towards the axis of rotation of the carrier, so that when any one of said chambers occupies its uppermost position, as shown in Fig. 2 in connection with chamber 44, air can easily escape therefrom, as shown by bubbles 47, so as to permit liquid to flow into said chamber, whereas when any one of said chambers occupies its lowermost position, as shown in the same figure in connection with chamber 46, it is downwardly inclined so as to insure the discharge therefrom of the entire quantity of liquid therein contained. It must be observed that carrier 26 is not shown in Fig. 2 in a true diametrical section, but is shown in the section defined by line 2—2 of Fig. 5, with the portion thereof passing through chamber 44 angularly displaced to show said chamber in its uppermost position.

In order to enable liquid contained in the chamber registering with outlet 27 to flow out of said chamber, tap 29 is provided with an air vent 48, leading to the upper part of the open front end of said chamber, and a cock 49, inserted through said tap, controls both discharge outlet 30 and air vent 48.

To this end, said cock 49 is provided with a port 50, controlling discharge outlet 30, and a port 51, controlling air vent 48, so that when said cock is in the position shown in Fig. 2, both discharge outlet and said vent are closed, and when the cock is turned 90° to the position shown in Fig. 4, said discharge outlet and said air vent are both open.

Disk 41 bears indications, such as shown at 52, which cooperate with indicator 42 in indicating the position of the carrier, said indications corresponding to the capacity of the chambers, which will be set in the discharging position as each indication registers with indicator 42. Said disk 41 also performs the function of a means for controlling the operation of the cock, so as to permit said cock being turned to its discharging position only when one of the chambers registers therewith; also in order to prevent the carrier from being rotated when liquid is being discharged from one of its chambers. To this end, disk 41 is made polygonal in shape so that one of the flat portions of the periphery will remain in proximity of tap 29, running horizontally above said tap transversely thereof whenever one of the indications 52 registers with indicator 42. Cock 49 is provided with a laterally extending flat lug 53, which clears the plane of disk 41 when the cock is in its closed position, shown in Figs. 1 and 2, and which projects directly underneath and in close proximity of the flattened peripheral portion of disk 41, remaining directly above said tap when said disk is set in any one of its operative positions where one of the chambers carried by said carrier registers with the discharge outlet.

In this position said lug 53 will thus form an abutment for the flattened peripheral portion of disk 41, which will lock said disk, and consequently said carrier, against rotation in either direction.

Conversely, it is seen that when the dial occupies a position intermediate to its operative positions, its outwardly extending peripheral portions will project below the level of lug 53 and will form an abutment for said lug, preventing the cock being rotated from its closed to its open position. It is thus seen that the cock can be set in its open position only when one of the dispensing chambers registers with the discharge outlet, and that the carrier can be moved from one of its angular positions to another only when the cock is in its closed position. A condition is, therefore, established whereby the carrier must first be set at the position corresponding to the quantity of liquid to be discharged. The cock can then be turned to effect the discharge of the liquid, at the same time locking the carrier in position, until such time as the cock is returned to its closed position.

Means are preferably provided for preventing operation of the device by unauthorized persons, and to this end cock 49 can be provided with a locking member 54, pivoted to its upper end at 55, said locking member serving as a handle for the cock and also having an opening 56, adapted to engage a lug 57, outwardly extending from tap 29 and projecting therefrom, the projecting portion of said lug being provided with an opening 58, adapted to receive a padlock, retaining the locking member in its locking position.

It will be observed that the liquid within the container can thus be discharged only in predetermined quantities a little at a time and that a portion of said liquid will always remain within the lower receptacle 10. In order to permit the entire liquid content of the receptacle being drawn off said receptacle is preferably provided with an auxiliary tap 59, in close proximity of its bottom 28, which is preferably directed at a slant, as shown in Fig. 2, said auxiliary tap being provided with means for locking it in the closed position, said means being represented by way of example by a locking member 60, pivotally connected at 61 to the cock of said auxiliary tap and by a padlock receiving lug 62, outwardly extending from said tap and projecting from the front end of said locking member.

It will also be observed that in the arrangement shown the graduation 23 provided on the glass cylinder only indicates either the quantity of liquid withdrawn or the quantity of liquid remaining within the container, so long as the level of said liquid reaches the inside of said glass cylinder. When the level of the liquid within the container no longer reaches up to the glass cylinder, indications of whatever liquid may be withdrawn from the lower receptacle 10 are not obtainable with the type of graduation shown, although indicating means could be devised to provide such indications if necessary.

However, in a case as that illustrated where indications of withdrawals of liquid are only furnished up to such point where the liquid reaches a certain level, and not below said level, it is desirable to provide means for automatically preventing further withdrawals of liquid when said minimum level has been reached. To this end, carrier 26 is shown provided with a rearwardly extending flange 64, provided with vertically directed openings, such as 65, circumferentially spaced to correspond with the various operative positions of said carrier and base 12 is shown provided with an inwardly extending support 66, in which is mounted, so as to be vertically slidable, a rod 67, the upper end of which extends vertically from said support and carries a float 68.

Said rod 67 is coaxial with such opening 65 of flange 64 as may happen to occupy its uppermost position when the carrier is set at the corresponding operative position, so that if rod 67 is caused to descend, its lower end 69 will enter opening 65 and will thus lock the carrier against further rotation in either direction.

The lower portion of rod 67 is provided with a collar 70, which abutting against the support limits the upward movement of rod 67 caused by float 68.

It will be observed that said float 68 is placed at or in proximity of the lower end of the glass cylinder so that when the liquid reaches the level defined by dotted line 71, the float is no longer urged by said liquid to maintain rod 67 in its raised position, and the combined weight of said rod and float will cause said rod to descend until its lower end 69 will engage the opening 65 opposite thereto.

In the operation of the device it is desirable to make sure that only chambers which have been filled are brought to the discharging position, therefore, means are provided allowing rotation of the carrier in one direction but restraining it from rotation in the opposite direction. For instance, the periphery of the carrier can be formed with notches, such as 72, engageable by a spring pressed pawl 73 in the operative positions of said carrier, so that while it is possible to rotate said carrier in a clockwise direction, as shown by the arrow in Fig. 5, it is not possible to rotate it in the opposite direction. Therefore, chamber 46, for instance, which is shown in the discharging position must be brought once more to its uppermost position where it can be refilled before it can again be brought to its discharging position.

If desired, a bar 74 can be fixed to the side of the tap, as shown at 75 in Fig. 1, so as to extend downwardly therefrom, and serve as a pivotal support for an arm 76 carrying a plate 77, on which can be placed a cup 78, adapted to receive the liquid discharged from tap 29.

Figure 8:
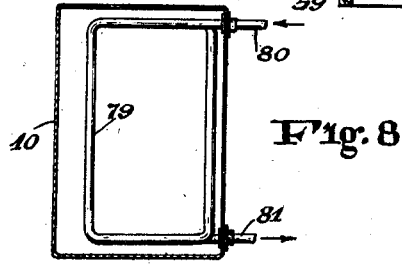
Fig. 8 is a section in a reduced scale through line 8—8 of Fig. 2.

It is, of course, possible to equip the container with means for heating or cooling the liquid content thereof and by way of example, in Figs. 2 and 8, I show said container equipped with a coil 79, having an inlet 80 and an outlet 81, through which a temperature controlling medium may be caused to circulate.

The quantity of liquid discharged each time that the device is operated is the sum of the quantity of liquid containing in the chamber registering with the outlet and that contained in the tract of discharge outlet 30 intervening between the cock and said chamber. In order to insure the discharge of the correct amount each time, it is well to make sure that liquid is always contained in the tract of the discharge outlet 30 intervening between the cock and the rear end of the tap before the discharge from a chamber actually takes place, because this automatically starts the outward flow of liquid through discharge outlet 30 and the initial flow of air through vent 48 when the cock is brought to its open position. Therefore, to this end, carrier 26 is provided with a number of openings, such as 82, at points intermediate its various operative positions, said openings being circumferentially arranged to register with the rear end of discharge outlet 30, during the rotation of the carrier.

It is obvious that the constructional details of the apparatus may vary from those shown without departing from the inventive idea; the drawings, therefore, should be understood as being intended for illustrative purposes only and not in a limiting sense.

I accordingly reserve the right to carry my invention into practice in all those ways and manners which may enter, fairly, into the scope of the appended claims.

I claim:

1. In a liquid dispensing apparatus the combination, with a container provided with a discharge outlet and means for controlling said outlet, of a carrier movable across said outlet, a plurality of chambers of different capacities forming part of said carrier, and means for selectively setting said carrier at any one of various operative positions, where one of said chambers, to the exclusion of the others, communicates with said outlet to discharge a predetermined quantity of liquid therefrom.

2. In a liquid dispensing apparatus the combination, with a container provided with a discharge outlet and means for controlling said outlet, of a carrier movable across said outlet, a plurality of chambers of different capacities forming part of said carrier, means for selectively setting said carrier at any one of various operative positions, where one of said chambers, to the exclusion of the others, communicates with said outlet to discharge a predetermined quantity of liquid therefrom, and means for admitting air to the chamber from which liquid is to be discharged.

3. In a liquid dispensing apparatus the combination, with a container provided with a discharge outlet and means for controlling said outlet, of a carrier movable across said outlet, a plurality of chambers of different capacities forming part of said carrier, means for selectively setting said carrier at any one of various operative positions, where one of said chambers, to the exclusion of the others, communicates with said outlet to discharge a predetermined quantity of liquid therefrom, and a vent, also controlled by said outlet controlling means, for admitting air to the chamber from which liquid is to be discharged.

4. In a liquid dispensing apparatus the combination, with a container provided with a discharge outlet and means for controlling said outlet, of a carrier rotatable about a substantially horizontal axis, movable across said outlet, a plurality of chambers of different capacities forming part of said carrier, said chambers being adapted to register with said outlet, and having at least that part of their peripheral surface which is lowermost in their outlet registering position, rearwardly inclined towards the axis of rotation of said carrier, and means for selectively setting said carrier at any one of various operative positions, where one of said chambers, to the exclusion of the others, communicates with said outlet to discharge a predetermined quantity of liquid therefrom.

5. In a liquid dispensing apparatus the combination, with a container provided with a discharge outlet and means for controlling said outlet, of a carrier movable across said outlet, a plurality of chambers of different capacities forming part of said carrier, means for selectively setting said carrier at any one of various operative positions, where one of said chambers, to the exclusion of the others, communicates with said outlet to discharge a predetermined quantity of liquid therefrom, and means insuring a close contact between the inner surface of said container surrounding said outlet, and the portion of said carrier opposite thereto.

6. In a liquid dispensing apparatus the combination, with a container provided with a discharge outlet and means for controlling said outlet, of a carrier movable across said outlet, a plurality of chambers of different capacities forming part of said carrier, means for selectively setting said carrier at any one of various operative positions, where one of said chambers, to the exclusion of the others, communicates with said outlet to discharge a predetermined quantity of liquid therefrom, and means for indicating the position of said carrier.

7. In a liquid dispensing apparatus the combination, with a container provided with a discharge outlet and means for controlling said outlet, of a carrier movable across said outlet, a plurality of chambers of different capacities forming part of said carrier, means for selectively setting said carrier at any one of various operative positions, where one of said chambers, to the exclusion of the others, communicates with said outlet to discharge a predetermined quantity of liquid therefrom, and means, operatively associated with said carrier setting means, governing the operation of said outlet controlling means.

8. In a liquid dispensing apparatus the combination, with a container provided with a discharge outlet and means for controlling said outlet, of a carrier movable across said outlet, a plurality of chambers of different capacities forming part of said carrier, means for selectively setting said carrier at any one of various operative positions, where one of said chambers, to the exclusion of the others, communicates with said outlet to discharge a predetermined quantity of liquid therefrom, and means operatively associated with said outlet controlling means, governing the operation of said carrier setting means.

9. In a liquid dispensing apparatus the combination, with a container provided with a discharge outlet and means for controlling said outlet, of a carrier movable across said outlet, a plurality of chambers of different capacities forming part of said carrier, means for selectively setting said carrier at any one of various operative positions, where one of said chambers, to the exclusion of the others, communicates with said outlet to discharge a predetermined quantity of liquid therefrom, and means automatically preventing further operation of said carrier, when a certain predetermined minimum liquid level within said container has been reached.

10. In a liquid dispensing apparatus the combination, with a container provided with a discharge outlet and means for controlling said outlet, of a carrier rotatable about a substantially horizontal axis, movable across said outlet, a plurality of chambers of different capacities forming part of said carrier, said chambers being adapted to register with said outlet, and having at least that part of their peripheral surface which is lowermost in their outlet registering position, rearwardly inclined towards the axis of rotation of said carrier, means for selectively setting said carrier at any one of various operative positions, where one of said chambers, to the exclusion of the others, communicates with said outlet to discharge a predetermined quantity of liquid therefrom, a vent, also controlled by said outlet controlling means, for admitting air to the chamber from which liquid is to be discharged, means for indicating the position of said carrier, and means, operatively associated with said carrier setting means, governing the operation of said outlet controlling means.

11. In a liquid dispensing apparatus the combination, with a container provided with a discharge outlet and means for controlling said outlet, of a carrier movable across said outlet, a plurality of chambers of different capacities forming part of said carrier, means for selectively setting said carrier at any one of various operative positions, where one of said chambers, to the exclusion of the others, communicates with said outlet to discharge a predetermined quantity of liquid therefrom, and means for indicating the total amount of liquid withdrawn from the container.

12. In a liquid dispensing apparatus, the combination, with a container provided with a discharge outlet and means for controlling said outlet, of a carrier rotatable about a substantially horizontal axis, movable across said outlet, a plurality of chambers of different capacities forming part of said carrier, said chambers being adapted to register with said outlet, and having at least that part of their peripheral surface which is lowermost in their outlet registering position, rearwardly inclined towards the axis of rotation of said carrier, means for selectively setting said carrier at any one of various operative positions, where one of said chambers, to the exclusion of the others, communicates with said outlet to discharge a predetermined quantity of liquid therefrom, and means allowing rotation of said carrier in one direction, and preventing it in the opposite direction.

13. A liquid dispensing apparatus comprising a container having a discharge outlet, a substantially horizontal shaft rotatably mounted through the lower part of one of the sides of said container, a carrier within said container, mounted on said shaft, abutting against said outlet, a plurality of open end chambers of different capacities, adapted to register with said outlet, rearwardly extending from said carrier in a direction inclined towards the axis of rotation thereof, a vent for admitting air to the chambers from which liquid is to be discharged, a cock controlling said vent and discharge outlet, and means associated with said shaft, allowing operation of said cock to open position, only when one of said chambers has reached its discharging position behind said outlet and preventing operation of said carrier after said cock has been brought to its open position.

14. A liquid dispensing apparatus comprising a container having a discharge outlet, a substantially horizontal shaft rotatably mounted through the lower part of one of the sides of said container, a carrier within said container, mounted on said shaft, abutting against said outlet, a plurality of open end chambers of different capacities, adapted to register with said outlet, rearwardly extending from said carrier in a direction inclined towards the axis of rotation thereof, a vent for admitting air to the chamber from which liquid is to be discharged, a cock controlling said vent and discharge outlet, and a member mounted on said shaft, adapted to indicate the position of said carrier, and allowing operation of said cock to open position, only when one of said chambers has reached its discharging position behind said outlet and preventing operation of said carrier after said cock has been brought to its open position.

15. A liquid dispensing apparatus comprising a container having a discharge outlet, a substantially horizontal shaft rotatably mounted through the lower part of one of the sides of said container, a carrier within said container, mounted on said shaft, abutting against said outlet, a plurality of open end chambers of different capacities, adapted to register with said outlet, rearwardly extending from said carrier in a direction inclined towards the axis of rotation thereof, a vent for admitting air to the chamber from which liquid is to be discharged, a cock controlling said vent and discharge outlet, a member mounted on said shaft, adapted to indicate the position of said carrier, and allowing operation of said cock to open position, only when one of said chambers has reached its discharging position behind said outlet and preventing operation of said carrier after said cock has been brought to its open position, and means for indicating the total amount of liquid withdrawn from the container.

16. A liquid dispensing apparatus comprising a container having a discharge outlet, a substantially horizontal shaft rotatably mounted through the lower part of one of the sides of said container, a carrier within said container, mounted on said shaft, abutting against said outlet, a plurality of open end chambers of different capacities, adapted to register with said outlet, rearwardly extending from said carrier in a direction inclined towards the axis of rotation thereof, a vent for admitting air to the chamber from which liquid is to be discharged, a cock controlling said vent and discharge outlet, means associated with said shaft, allowing operation of said cock to open position, only when one of said chambers has reached its discharging position behind said outlet and preventing operation of said carrier after said cock has been brought to its open position, and means allowing rotation of said carrier in one direction, and preventing it in the opposite direction.

17. A liquid dispensing apparatus comprising a container having a discharge outlet, a substantially horizontal shaft rotatably mounted through the lower part of one of the sides of said container, a carrier within said container, mounted on said shaft, abutting against said outlet, a plurality of open end chambers of different capacities, adapted to register with said outlet, rearwardly extending from said carrier in a direction inclined towards the axis of rotation thereof, a vent for admitting air to the chamber from which liquid is to be discharged, a cock controlling said vent and discharge outlet, a member mounted on said shaft, adapted to indicate the position of said carrier, and allowing operation of said cock to open position, only when one of said chambers has reached its discharging position behind said outlet and preventing operation of said carrier after said cock has been brought to its open position, and means automatically preventing further operation of said carrier, when a certain predetermined minimum liquid level within said container has been reached.

18. A liquid dispensing apparatus comprising a container having a discharge outlet, a substantially horizontal shaft rotatably mounted through the lower part of one of the sides of said container, a carrier within said container, mounted on said shaft, abutting against said outlet, a plurality of open end chambers of different capacities adapted to register with said outlet, rearwardly extending from said carrier in a direction inclined towards the axis of rotation thereof, a vent for admitting air to the chamber from which liquid is to be discharged, a cock controlling said vent and discharge outlet, a member mounted on said shaft, adapted to indicate the position of said carrier, and allowing operation of said cock to open position, only when one of said chambers has reached its discharging position behind said outlet and preventing operation of said carrier after said cock has been brought to its open position, means allowing rotation of said carrier in one direction, and preventing it in the opposite direction, and means automatically preventing further operation of said carrier, when a certain predetermined minimum liquid level within said container has been reached.

19. A liquid dispensing apparatus comprising a container having an inlet and a discharge outlet, a substantially horizontal shaft rotatably mounted through the lower part of one of the sides of said container, a carrier within said container, mounted on said shaft, abutting against said outlet, a plurality of open end chambers of different capacities, adapted to register with said outlet, rearwardly extending from said carrier in a direction inclined towards the axis of rotation thereof, a vent for admitting air to the chamber from which liquid is to be discharged, a cock controlling said vent and discharge outlet, means associated with said shaft, allowing operation of said cock to open position, only when one of said chambers has reached its discharging position behind said outlet and preventing operation of said carrier after said cock has been brought to its open position, means allowing rotation of said carrier in one direction, and preventing it in the opposite direction, and means for locking both the inlet and outlet of said container.

20. A liquid dispensing apparatus comprising a container having a discharge outlet, a substantially horizontal shaft rotatably mounted through the lower part of one of the sides of said container, a carrier within said container, mounted on said shaft, abutting against said outlet, a plurality of open end chambers of different capacities, adapted to register with said outlet, rearwardly extending from said carrier in a direction inclined towards the axis of rotation thereof, a vent for admitting air to the chamber from which liquid is to be discharged, a cock controlling said vent and discharge outlet, a member mounted on said shaft, adapted to indicate the position of said carrier, and allowing operation of said cock to open position, only when one of said chambers has reached its discharging position behind said outlet and preventing operation of said carrier after said cock has been brought to its open position, means for indicating the total amount of liquid withdrawn from the container, and means allowing rotation of said carrier in one direction, and preventing it in the opposite direction.

ROBERT van MEEUWEN.